INVENTORS:
Alex Zletz
Don R. Carmody
Evan A. Mayerle

INVENTORS:
Alex Zletz
Don R. Carmody
Evan A. Mayerle
BY
Michael Dufnery
ATTORNEY

United States Patent Office 2,898,733
Patented Aug. 11, 1959

2,898,733

ROCKET PROPULSION METHOD

Don R. Carmody, Crete, Evan A. Mayerle, Chicago, and Alex Zletz, Park Forest, Ill., assignors to Standard Oil Company, Chicago, Ill., a corporation of Indiana Application September 16, 1953, Serial No. 380,452

4 Claims. (Cl. 60—35.4)

This invention relates to gas generation and rocket propulsion. More particularly the invention relates to a liquid rocket fuel which is suitable for use at very low atmospheric temperatures.

Bipropellant rockets have assumed a larger and larger place in the military and commercial fields both in missiles and in the assisted take-off of aircraft. In the bipropellant rocket a liquid fuel and a liquid oxidizer are injected separately and substantially simultaneously into the combustion chamber of the rocket motor; the fuel and oxidizer ignite hypergolically or are ignited by an external system such as a spark plug and burn to form a large volume of gases at high temperature; these gases are passed from the combustion chamber by way of an exit orifice.

A hypergolic fuel-oxidizer system is preferred because an auxiliary igniting system is thereby eliminated. In general the hypergolic activity of liquid fuels and nitric acid oxidizers decreases markedly with lowering of the temperature of the fuel and oxidizer. An air-to-air missile usually is exposed to the extreme cold of high altitudes for a period long enough to substantially attain atmospheric temperature. At the altitudes now commonly utilized by military aircraft, temperatures on the order of about $-65°$ F. are customary and $-100°$ F. is not uncommon.

Not only must the fuel have a melting point below about $-65°$ F., but also the fuel should have a viscosity low enough to flow readily through the fuel lines at very low atmospheric temperatures, i.e., about $-65°$ F. or lower.

The presently known liquid rocket fuels which fulfill these requirements are extremely expensive; for most of these the price is quoted in dollars per pound. More economical fuels which meet these severe requirements are desired in order to expand the field of usefulness of rocket-propelled vehicles.

It is an object of this invention to produce a rocket fuel which is suitable for use at very low atmospheric temperatures, i.e., below about $-65°$ F. Another object is a liquid rocket fuel which is suitable for use at very low atmospheric temperatures and which is less expensive than the presently known fuels. Still another object is a method of gas generation by the hypergolic reaction of a nitric acid oxidizer and a liquid rocket fuel at very low atmospheric temperatures. Yet another object is a method of rocket propulsion by the hypergolic reaction of the nitric acid oxidizer and a liquid rocket fuel at very low atmospheric temperatures.

Figure 1:
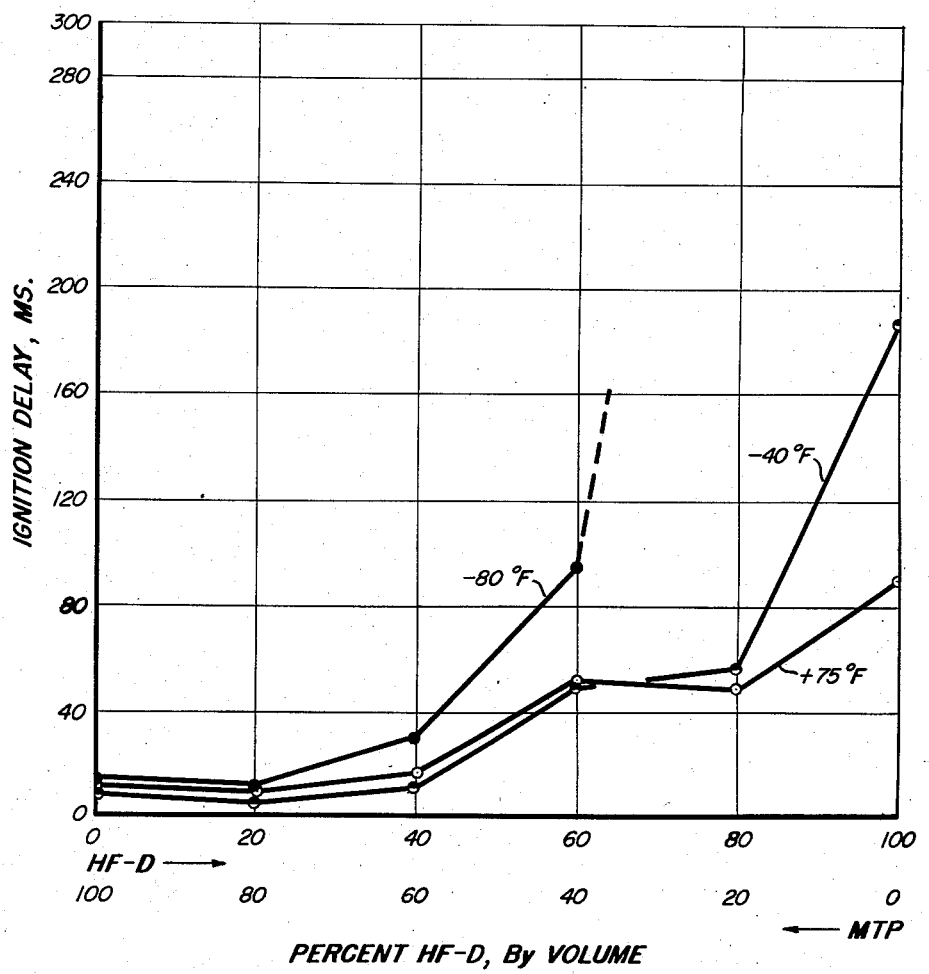
Figure 1 shows the ignition delays obtained with blends of trimethyl trithiophosphite and a liquid hydrocarbon mixture designated HF-D.

It has been found that a composition consisting essentially of at least about 40 volume percent of trimethyl trithiophosphite and the remainder a liquid hydrocarbon mixture which boils from about 250° to about 400° F. and which is derived by distillation from the product of the high temperature pyrolysis of hydrocarbons at a temperature of above about 1250° F. is suitable for use as a hypergolic rocket fuel at very low atmospheric temperatures, i.e., below about $-65°$ F.

The above-defined fuel composition has a satisfactory hypergolic activity with certain nitric acid oxidizers when the fuel and the oxidizer at the moment of contact in the gas generation chamber or the rocket motor are at a temperature below about $-65°$ F.

The trithiophosphites are oxidized quite readily by atmospheric oxygen. Slight amounts of oxidation products have little adverse effect on the hypergolic activity of the composition of this invention. However, small amounts of oxidation products have an extremely deleterious effect on the viscosity of the composition and therefore suitable precaution should be taken to avoid prolonged exposure to the atmosphere at atmospheric temperature. However, it is intended that the term "trithiophosphite" shall also include slight amounts of these oxidation products.

The trithiophosphites may be made by the reaction of a mercaptan and phosphorus trichloride, in which case slight amounts of these materials may be present in the trithiophosphite product. When the trithiophosphite is made by the reaction of a disulfide and phosphorus, slight amounts of these materials may be present in the trithiophosphite product. The term "trithiophosphite" is intended to include the presence of slight amounts of material such as mercaptans, disulfides, etc. In general it is preferred that trithiophosphites of high purity be used in the composition of this invention.

The rocket fuel composition of this invention contains as one component trimethyl trithiophosphite.

The rocket fuel composition of this invention contains as the other component a liquid hydrocarbon mixture. This liquid hydrocarbon mixture boils between about 250° and about 400° F. and is derived by distillation from the liquid product of the high temperature pyrolysis of hydrocarbons at a temperature of at least about 1250° F. The preferred liquid hydrocarbon mixture boils between about 270° and about 375° F.

One source of the mixture of this invention is the product from the pyrolysis of hydrocarbons in the vapor phase at temperatures from at least about 1250° F. to 1800° F., at pressures below about 100 p.s.i.a., usually below about 50 p.s.i.a., and at contact times from about 0.05 to 5 seconds, usually below about 2 seconds. Suitable feeds are ethane, propane, butane, propylene, butylene, naphthas, gas oils and other hydrocarbons which can be vaporized at the temperature of pyrolysis without an excessive amount of coke formation. The high temperature vapor phase pyrolytic reaction is normally used for the production of olefinic gases, such as, ethylene and propylene; and for the production of aromatic hydrocarbons, such as, benzene, toluene and xylene. In general, at a given temperature, the longer the contact time the greater the amount of aromatics produced. The gases from the cracking reaction are rapidly cooled, usually by quenching with water, to a temperature of about 400° F. A viscous tarry material condenses out of the gases during the quenching. The gases from the quenching operation are compressed and cooled; a liquid material which boils between about 100° and 400° F. condenses out of the gases during this compression-cooling step. This liquid is commonly known as dripolene. The amount of tar and dripolene produced is dependent upon the feed, temperature, contact time and the pressure. The preferred operating conditions for the production of the hypergolic fuel mixture of this invention are a temperature from about 1400° to 1550° F., a contact time from about 0.1 to 1 second, a pressure below about 35 p.s.i.a., and a feed consisting of ethane or propane, or mixtures thereof.

The total liquid material product is an extremely complicated mixture of hydrocarbons. The tar, which is defined as the material boiling above about 400° F., consists mainly of naphthalene and alkylated naphthalene. An appreciable amount of anthracene is present and the remainder is thought to consist of other condensed-benzene ring compounds. This tar is non-hypergolic with nitric acid oxidizers at atmospheric temperatures. The presence of tarry material in the dripolene should be avoided.

The presence of a considerable amount of conjugated unsaturation in dripolene is evidenced by maleic anhydride values above about 60 and by the ease with which the dripolene can be resinified when using catalyst such as $AlCl_3$ or $BF_3$. Dripolene has never been completely analyzed because of its complexity. However, some of the components boiling below about 300° F. have been identified. These comprise minor amounts of propane, butane and pentane; some propylene and butylenes; appreciable amounts of butadiene; cyclopentadiene and cyclohexadiene in fair amounts; cyclopentane and cyclopentene are also present; about one-half of the dripolene consists of benzene, toluene, xylene and ethylbenzene; styrene is present in appreciable amounts.

The material boiling above 300° F. is known to contain some dicyclopentadiene; the remainder is thought to consist of higher boiling alkylated benzenes, condensed cycloolefins and cyclodienes; in addition aromatics which have been alkylated with cycloolefins and/or cyclodienes are thought to be present. When the ASTM end point of the dripolene is above about 400° F., a minor amount of naphthalene is usually also present. The presence of naphthalene is detrimental to the freezing point of the dripolene and normally the dripolene is cut to an end point of about 375° F. to eliminate naphthalene.

While the high temperature pyrolysis of hydrocarbons, such as, ethane, propane, gas oil, etc., is the preferred source of the mixture of this invention, other sources are available. These other sources produce in abundant supply a light oil fraction which contains a hypergolic fuel equivalent to that obtained from dripolene. The more common sources are related to the carbonization of coal. A very good source is the light oil obtained from the carbonization of coal at low temperatures, i. e., from about 1250° to 1600° F. Appreciable amounts are obtainable from the light oil derived from the so-called high temperature carbonization of coal for the production of metallurgical coke. An excellent source is the light oil derived from the production of coal gas, particularly when this process is carried out at from about 1250° to 1650°.

Still another source is the drip oil obtained from the manufacture of producer gas when using coal. An excellent source is the drip oil obtained in the manufacture of carbureted water gas.

It is to be understood that the above list of sources of the fuel of this invention is not complete and that there are other lesser known sources. It is intended that the descriptive phrase "high temperature pyrolysis of hydrocarbons" includes all the processes operating at a temperature of at least about 1250° F. to produce a liquid hydrocarbon oil from which can be distilled a fraction containing polyolefinic linkages and having a maleic anhydride value of at least about 20 and boiling from at least about 250° to about 400° F., preferably from about 270° to about 375° F.

By way of an example, a particular liquid hydrocarbon mixture suitable for use in the invention is described below. In this particular example the feed to the pyrolysis consisted of ethane, 8 volume percent; propane, 90%; and butanes, 2%. The pressure at the inlet to the furnace was about 40 p.s.i.g. and the exit pressure was about 11 p.s.i.g. The transfer line temperature was 1520° F. and the contact time in the high temperature zone in the furnace was about 0.2 second. The hot gases were quenched with water to eliminate tar. The dripolene fraction amounted to 3 weight percent of the feed. The non-condensible product contained about 25 volume percent of ethylene and about 11 volume percent of propylene.

The dripolene was characterized as follows:

| ASTM distillation, ° F.: | |
|---|---|
| Initial | 106 |
| 10% | 158 |
| 20% | 174 |
| 30% | 186 |
| 40% | 196 |
| 50% | 210 |
| 60% | 230 |
| 70% | 264 |
| 80% | 324 |
| 90% | 366 |
| Max. | 396 |
| ° API | 35 |
| Refractive index, $n_D^{20}$ | 1.4830 |
| Bromine number, cg. $Br_2$/g | 89.4 |
| Maleic anhydride value, mg. M.A./g | 104.1 |

A sample of the dripolene was analyzed by conventional techniques for the presence of individual compounds or groups of closely related compounds. There are listed below the more or less positively identified components and the approximate amount present in volume percent.

| Compound: | Volume percent |
|---|---|
| Propane and propylene | 0.7 |
| Isobutane | 0.1 |
| Butylenes | 2. |
| n-Butane | 0.4 |
| Butadiene | 4. |
| Pentane | 0.4 |
| Pentadiene and cyclopentadiene | 8. |
| Pentene and cyclopentene | 6. |
| Benzene | 35. |
| Toluene | 8. |
| Xylenes | 5. |
| Styrene | 3. |
| Dicyclopentadiene | 5. |

A rocket fuel consisting essentially of at least about 40 volume percent trimethyl trithiophosphite and the remainder of the defined liquid hydrocarbon mixture boiling from about 250° to about 400° F., is characterized by a suitable short ignition delay with certain nitric acid oxidizers hereinafter defined. The composition is characterized by a very low viscosity at very low atmospheric temperatures, i. e., below −65° F. and even at −100° F. The melting point of the composition makes it very suitable for use at very low atmospheric temperatures.

A composition consisting essentially of about 50 volume percent of the defined liquid hydrocarbon mixture boiling from about 250° to about 400° F. and about 50 volume percent of trimethyl trithiophosphite is particularly suitable for very low temperature operation because of its hypergolic activity with red fuming nitric acid at these temperatures. This particular composition is preferred when ignition delays on the order of 50 milliseconds are desired at temperatures on the order of −65° F.

A superior fuel for use at temperatures as low as −100° F. which is characterized by an ignition delay approximating that of the trimethyl trithiophosphite itself consists essentially of at least about 70 volume percent of trimethyl trithiophosphite and the remainder the defined liquid hydrocarbon mixture.

The rocket fuel composition of the invention is hypergolic at ordinary temperatures, i.e., about 75° F., with most nitric acid oxidizers. At temperatures on the order of 0° F. it is hypergolic with nitric acid oxidizers containing as much as 5 weight percent of non-acidic materials. These non-acidic materials may be water or pour point depressors such as potassium nitrite or sodium nitrate. At very low atmospheric temperatures such as −65° F., in order to get satisfactory ignition delays, the nitric acid oxidizers are selected from the class consisting of red fuming nitric acid, nitric acid-oleum mixtures and nitric acid-alkanesulfonic acid mixture. The nitric acid-oleum mixtures consist of white fuming nitric acid and oleum, for example, an 80:20 mixture. The nitric acid-alkanesulfonic acid mixtures may consist of mixtures of WFNA and methanesulfonic acid, ethanesulfonic acid, propanesulfonic acid, etc. It is preferred to use red fuming nitric acid containing at least about 16% of $N_2O_4$ as the oxidizer at very low temperatures.

A composition having hypergolic properties suitable for use at very low atmospheric temperatures with nitric acid oxidizers is obtained by blending trimethyl trithiophosphite and a liquid hydrocarbon mixture derived from the light oil product, boiling from about 100° to about 400° F., of the high temperature pyrolysis of hydrocarbons at a temperature of at least about 1250° F. by chilling said oil to a temperature of about −70° F., or lower, and separating said mixture from solid materials.

*Example I*

The ignition delays obtainable with blends of trimethyl trithiophosphite (MTP) and a particular liquid hydrocarbon mixture (hereinafter designated as HF–D) are illustrated below.

The trimethyl trithiophosphite of this example was prepared by the reaction of methyl disulfide and yellow phosphorus according to the method of U.S. Patent 2,542,370. The melting point of this trimethyl trithiophosphite was determined to be between −74° and −64° F. The melting point was determined by freezing the sample by means of liquid nitrogen, seeding was necessary, and then noting the temperature range over which the solid melted. The MTP supercooled easily; the solid MTP appeared to be a glass rather than crystalline. The nature of the material made it extremely difficult to obtain a precise melting point.

The HF–D used in this example had the following properties:

| | |
|---|---|
| H/C atomic ratio | 1.18 |
| Heat of combustion, B.t.u./lb. | 18,249 |
| Bromine number | 112 |
| Maleic anhydride value | 24.8 |
| Melting point, ° F. | <−100 |
| Specific gravity, +70° F. | .940 |
| Viscosity, centistokes: | |
| +70° F. | 1.714 |
| −100 | 41.6 |
| ASTM distillation, percent distilled: | |
| IBP | 252 |
| 10 | 286 |
| 20 | 298 |
| 30 | 309 |
| 40 | 320 |
| 50 | 329 |
| 60 | 338 |
| 70 | 347 |
| 80 | 359 |
| 90 | 388 |
| FBP | 428 |

The ignition delay is defined as the time between the mixing of the fuel and the oxidizer and the appearance of a visible flame. The ignition delays in this example were determined by means of an apparatus which permitted the measurement of the delay in milliseconds. The ignition delays were determined by cooling the fuel and the oxidizer separately to the desired temperature. The oxidizer in the ordinary temperature experiments was white fuming nitric acid which contained about 2 weight percent of water. The very low temperature experiments were carried out using red fuming nitric acid containing 22 weight percent of $N_2O_4$. The data derived in these tests are set out below:

| Blend, Vol. Percent | | Ignition Delay, Milliseconds | | | |
|---|---|---|---|---|---|
| HF-D | MTP | +75° F.[a] | −40° F.[b] | −65° F.[b] | −80° F.[b] |
| 0 | 100 | 11.7 | 8.1 | 8.7 | [c] 12.5 |
| 10 | 90 | | | | |
| 20 | 80 | 9.3 | 5.0 | 5.5 | 10.5 |
| 30 | 70 | | | | |
| 40 | 60 | 16.6 | 11.2 | 21.9 | 30.4 |
| 50 | 50 | | | | |
| 60 | 40 | 51.3 | 48.8 | 68.2 | 93.6 |
| 70 | 30 | | | | |
| 80 | 20 | 40.8 | 56.2 | 61.9 | ca. 400 |
| 90 | 10 | | | | |
| 100 | 0 | [d] N.I. | 187 | | 235 |

[a] WFNA.
[b] 22% RFNA.
[c] Supercooled.
[d] No ignition.

The ignition delays for +75° F., −40° F. and −80° F. have been set out in graphical form in Figure 1. Figure 1 shows that the blend has approximately the same ignition delay as the trimethyl trithiophosphite itself at all temperatures until the blend contains up to about 30 volume percent of the HF–D hydrocarbon, i.e., an ignition delay of about 20 milliseconds. The data further show that the ignition delays of the blends are relatively unaffected by temperature to a temperature of about −65° F. Considering the extremely long delay of the HF–D hydrocarbon alone, the flatness of the ignition delays of the various blends at temperatures above about −65° F. is most surprising.

For air-to-air missile usage an ignition delay of as much as 100 milliseconds is considered suitable. More desirably the ignition delay should be on the order of 50 milliseconds. It is preferred that the ignition delay should be nearly instantaneous. The data presented herein indicate that a rocket fuel of suitable hypergolic activity is obtainable by a blend containing at least about 30 volume percent of trimethyl trithiophosphite and the remainder the defined liquid hydrocarbon mixture. A fuel which has an ignition delay of about 50 milliseconds or less at temperatures on the order of −80° F., is obtainable by blending approximately equal volumes of the trimethyl trithiophosphite and the defined liquid hydrocarbon mixture. A fuel which is characterized by an ignition delay approximating that of the trimethyl trithiophosphite itself and which is suitable for use at temperatures on the order of −100° F., is obtained by a blend containing at least about 70 volume percent trimethyl trithiophosphite and the remainder the defined liquid hydrocarbon mixture.

*Example II*

The data of Example I indicate that a blend consisting essentially of about 70% trimethyl trithiophosphite and about 30% HF–D contains about the maximum amount of HF–D to produce a fuel having an ignition delay approximating that of the trimethyl trithiophosphite itself at temperatures of −80° F. or lower. The melting point of a blend containing 70 volume percent MTP and 30 volume percent of HF–D was determined. This blend melted over a range of temperature extending from −136° to −92° F. This melting point range indicates that this blend is surely useful at −90° F. and probably useful at temperatures of −100° F.

Figure 2:
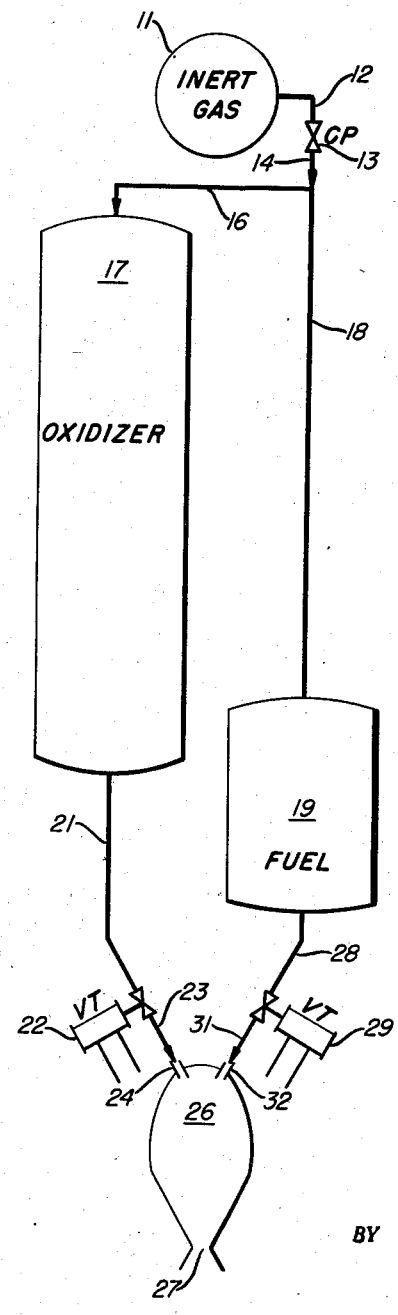
Figure 2 shows the schematic layout of a bipropellant rocket.

By way of illustration the composition of this invention is applied to the propulsion of an air-to-air missile. Figure 2 which forms a part of this specification shows schematically the bipropellant fuel system, the motor and other parts of such a missile.

In Figure 2 vessel 11 contains a quantity of gas at high pressure; this gas must be inert with respect to the oxidizer and the fuel; suitable gases are nitrogen and helium. Herein helium is used as the inert gas. Helium from vessel 11 is passed through line 12 and through valve 13 which regulates the flow of gas to maintain a constant pressure beyond valve 13. From valve 13 helium is passed through lines 14 and 16 into vessel 17 and simultaneously through line 18 into vessel 19.

Vessel 17 contains the oxidizer. Helium pressure forces the oxidizer out of vessel 17 through line 21 to valve 22. Valve 22 is a solenoid actuated throttling valve. Suitable electrical lines connect valve 22 to an electrical source and operating switch (not shown) at the control panel of the aircraft. The oxidizer is passed through line 23 and injector 24 into combustion chamber 26. Combustion chamber 26 is provided with an outlet nozzle 27.

Vessel 19 contains the fuel. Vessels 17 and 19 are constructed to withstand the high pressure imposed by the helium gas. The gas pressure forces fuel from vessel 19 through line 28 to solenoid actuated throttling valve 29. Valve 29 is similar in construction and in actuation to valve 22. The fuel is passed through line 31 and injector 32 into combustion chamber 26.

Valves 22 and 29 are of such a size and setting that a predetermined ratio of oxidizer-to-fuel is passed into combustion chamber 26. Injectors 24 and 32 are so arranged that the streams of oxidizer and fuel converge and contact each other forcibly, resulting in a very thorough intermingling of the fuel and the oxidizer.

The missile is launched by activating the solenoids on valves 22 and 29. In this illustration 4.5 lbs. of 22% RFNA are introduced into combustion chamber 26 per pound of fuel. Herein the fuel consists of 50 volume percent of trimethyl trithiophosphite and 50 volume percent of the defined liquid hydrocarbon mixture boiling between about 275° and 375° F. The oxidizer and the fuel react almost instantaneously upon contact in the combustion chamber; a large volume of very hot gas is produced in the combustion chamber, which gas escapes through orifice 27. The reaction from this expulsion of gas drives the missile toward its target.

Thus having described the invention, what is claimed is:

1. A rocket propulsion method which comprises injecting separately and substantially simultaneously into the combustion chamber of a rocket motor a nitric acid oxidizer selected from the class consisting of red fuming nitric acid and nitric acid-oleum mixtures containing about 20% of oleum and a liquid rocket fuel consisting of (a) at least about 50 volume percent of trimethyltrithiophosphite and the remainder essentially only a liquid hydrocarbon mixture which boils over the range of about 250° to 400° F. being derived from the liquid product of the pyrolysis of a member of the class consisting of ethane, propane, butane, propylene, butylene, naphthas and gas oils in the vapor phase at a temperature between about 1250° and 1800° F. at a cracking zone pressure of not more than 100 p.s.i.a. and for a cracking zone residence time between about 0.05 and 5 seconds, by separating a liquid product from other cracking products and distilling said liquid product to obtain said mixture, said mixture being characterized by a hypergolic reaction when contacted with red fuming nitric acid at about +75° F., said oxidizer and said fuel being injected in an amount and at a rate sufficient to initiate a hypergolic reaction and to support combustion of the fuel.

2. The method of claim 1 wherein said oxidizer is red fuming nitric acid containing at least about 16% of $N_2O_4$.

3. The method of claim 1 wherein said hydrocarbon mixture boils over the range from about 270° to about 375° F.

4. The method of claim 1 wherein said fuel consists of about 70 volume percent of trimethyltrithiophosphite and about 30 volume percent of said hydrocarbon mixture.

References Cited in the file of this patent

UNITED STATES PATENTS

| | | |
|---|---|---|
| 2,261,227 | Cloud | Nov. 14, 1941 |
| 2,542,370 | Stevens et al. | Feb. 20, 1951 |
| 2,573,471 | Malina et al. | Oct. 30, 1951 |

OTHER REFERENCES

Journal of the American Rocket Society, No. 72, December 1947, pages 17, 32, 35.